United States Patent [19]
Drower et al.

[11] Patent Number: 5,718,342
[45] Date of Patent: Feb. 17, 1998

[54] EASILY ASSEMBLED STORAGE RACK WITH SUPPORT LOOPS

[75] Inventors: Herbert M. Drower, Wilmette, Ill.; Dean S. Paris, Takoma Park, Md.

[73] Assignee: Transilwrap Compnay, Inc., Chicago, Ill.

[21] Appl. No.: 794,813

[22] Filed: Feb. 4, 1997

[51] Int. Cl.$^6$ .................................................. A47F 1/00
[52] U.S. Cl. .................................... 211/60.1; 211/89
[58] Field of Search ........................ 211/89, 70.6, 120, 211/94

[56] References Cited

U.S. PATENT DOCUMENTS

| | | | |
|---|---|---|---|
| 2,397,291 | 3/1946 | Robertson | 211/120 X |
| 2,430,624 | 11/1947 | Vollmer | 211/120 |
| 3,094,129 | 6/1963 | Wills | 211/89 X |
| 4,757,906 | 7/1988 | Ovitz, III | 211/89 X |
| 4,936,469 | 6/1990 | Drower | 211/69.8 |
| 5,419,433 | 5/1995 | Niederberger et al. | 211/89 X |
| 5,570,794 | 11/1996 | Drower | 211/89 |

*Primary Examiner*—Peter M. Cuomo
*Assistant Examiner*—Stephen Vu

*Attorney, Agent, or Firm*—Dorn, McEachran, Jambor & Keating

[57] ABSTRACT

A storage rack for small articles, including an elongated housing having a top wall, a bottom wall and end walls. An elongated support bar is located between the top and bottom walls and extends between the end walls to which it is fastened. The elongated support bar has a transverse cross section which is non-circular. A multiplicity of retainer loops are mounted side by side on the elongated support bar with the end retainer loops constrained by engagement with the end walls of the elongated housing. Each retainer loop is formed of a strip of a tough, resilient, abrasive resistant resin having a bight portion and two legs. An opening is formed in each leg of each retainer loop near the distal end of the leg and is used for mounting the retainer loop on the elongated support bar. Each opening in each leg has a shape similar to but larger than the non-circular transverse cross section of the elongated support bar. A two-way retainer loop stop is formed at one end of the elongated support bar and a one-way stop, allowing the mounting of the retainer loops on, but not removal of the retainer loops from, is formed at the opposite end of the support bar to permit the retainer loops to be mounted on the support bar before the support bar is installed in the storage rack.

2 Claims, 2 Drawing Sheets

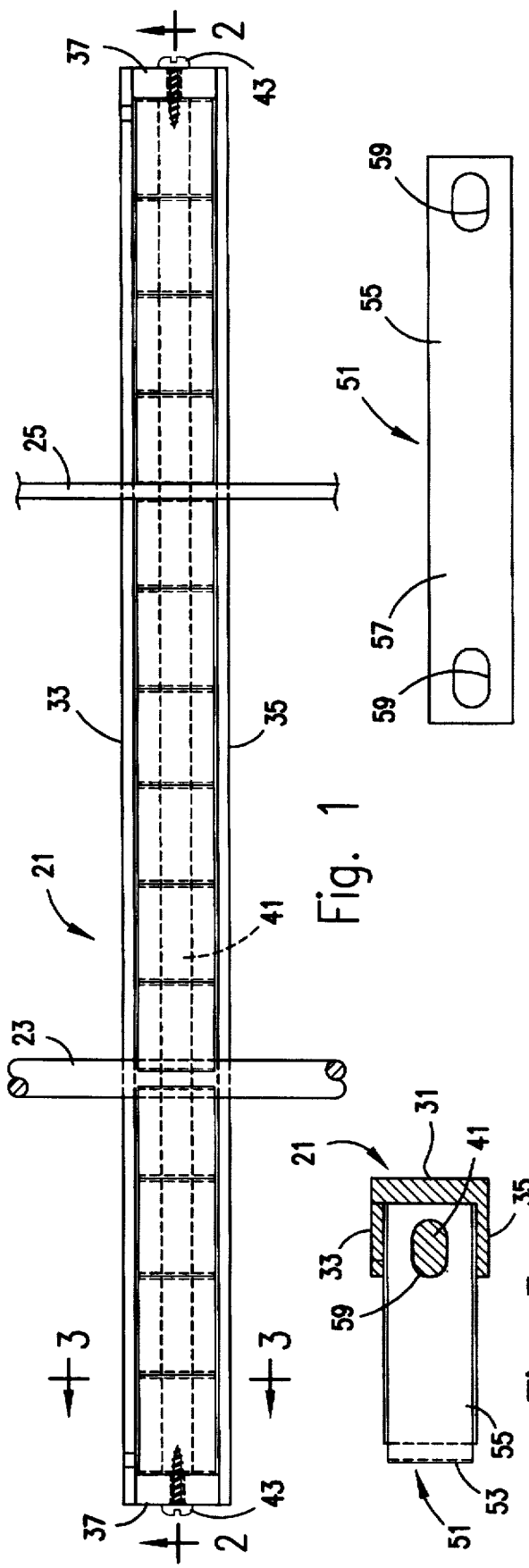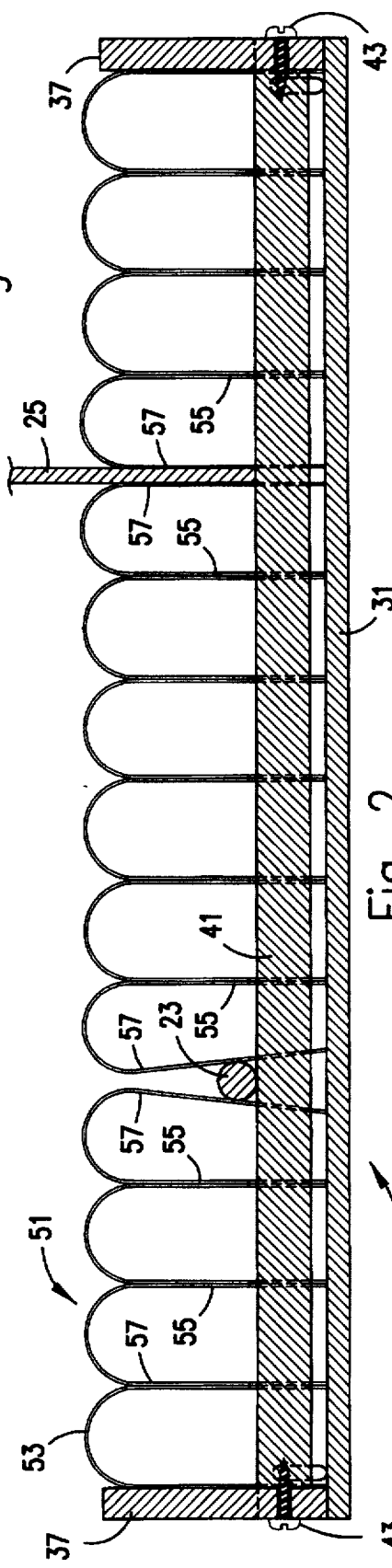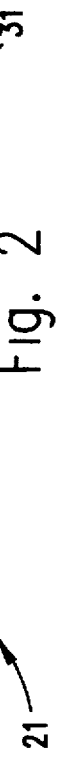

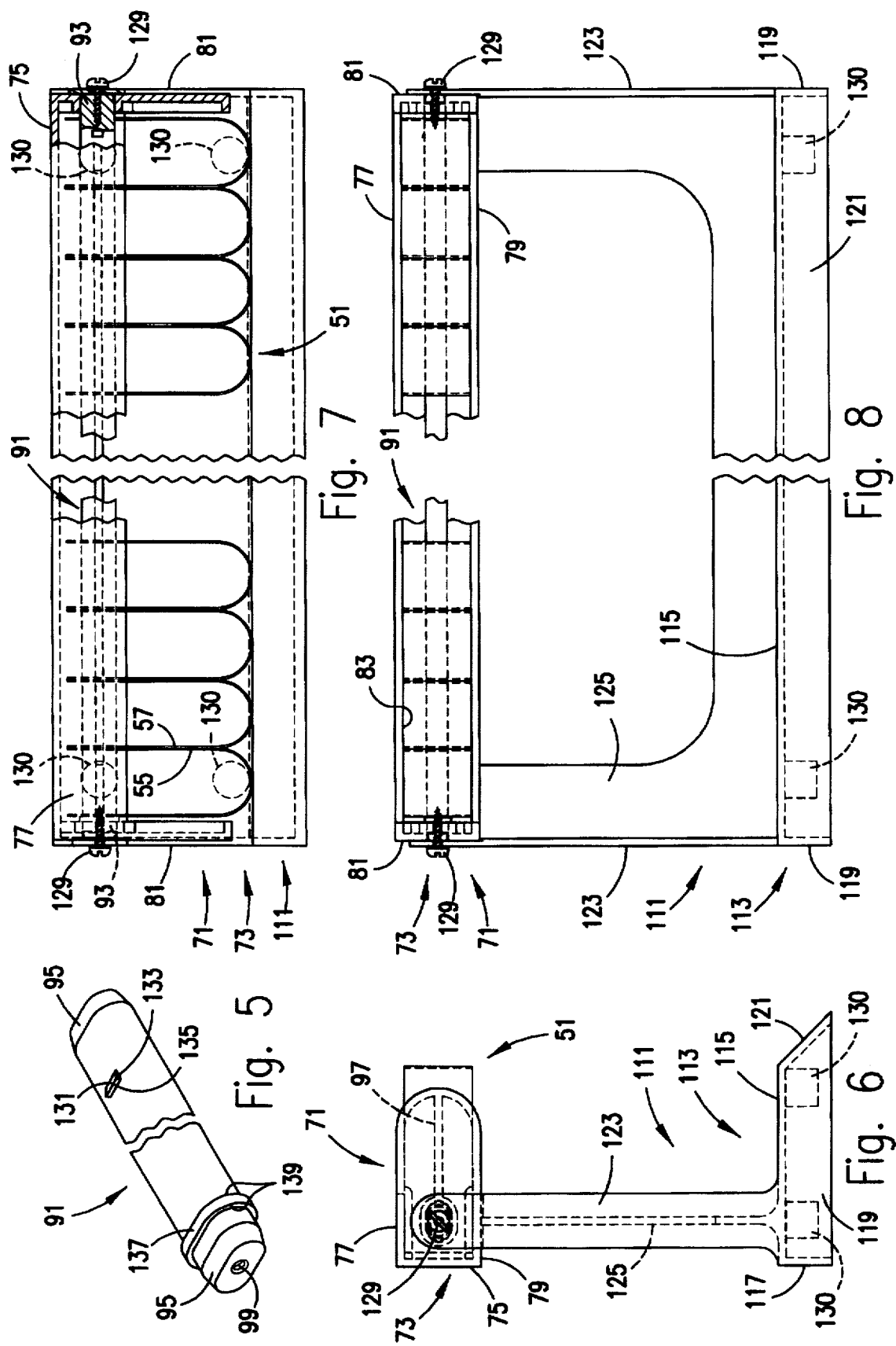

EASILY ASSEMBLED STORAGE RACK WITH SUPPORT LOOPS

BACKGROUND OF THE INVENTION

Storage racks for small articles, ranging from pencils and pens to other items such as paint brushes, cassettes and small containers are available in many sizes, styles, constructions and configurations. Such storage racks are shown and described in my U.S. Pat. Nos. 4,936,469, issued Jun. 26, 1990, and 5,570,794, issued Nov. 5, 1996.

The construction of my prior storage rack shown in U.S. Pat. No. 4,936,469 requires that the end portions of the legs of each retainer loop be bent at right angles to the adjacent portions of the legs and that they be positioned behind the slot into which the loop legs are inserted and also required a back member to engage the bent end portions of the legs to preclude withdrawal of the loops forwardly through the slots.

The construction of my prior storage rack shown in my U.S. Pat. No. 5,570,794 requires that a downwardly opening notch be formed in each leg of each retaining loop with the notch fitted over and receiving a tenon to preclude withdrawal of the loops forwardly through the transverse slots formed in an elongated support bar for the retainer loop.

SUMMARY OF THE INVENTION

It is a principle object of the present invention, therefore, to provide a new and improved storage rack for small articles which resists pulloff of the retainer loops while providing the ability to hold objects of different sizes and shapes as well as being easy to manufacture and assemble.

Another object of the invention is a new and improved storage rack for small articles which provides for ease of assembly of the retainer loops on the support bar of the storage rack.

An additional object of this invention are retainer loops that are firmly held on the support bar of the storage rack.

Yet another object of the invention is a storage rack for small articles utilizing retainer loops which may be installed on the support bar prior to the installation of the support bar in the storage rack.

Still another object of this invention is a support bar for retainer loops which permits the retainer loops to be preinstalled on the support bar by being slid over one end of the support bar and held against accidental release.

Accordingly, the invention relates to a storage rack for small articles including an elongated housing having a top wall, a bottom wall and end walls. An elongated support bar is located between the top and bottom walls and extends between the end walls. The elongated support bar has a transverse cross section which is non-circular. A multiplicity of retainer loops are mounted side by side on the elongated support bar. Each retainer loop is formed of a strip of a tough, resilient, abrasion resistant resin having a bight portion and two legs. An opening is formed in each leg of each loop near its distal end for mounting the retainer loop on the elongated support bar. Each opening in each leg of the retainer loop is shaped to be similar to but larger than the non-circular transverse cross section of the elongated support bar. The retainer loops may be preinstalled on the support bar before the support bar is installed on the storage rack. To maintain the retainer loops on the support bar until installation on the support rack, a full stop is provided at one end of the support bar and a ramped stop is provided at the opposite end of the support bar to permit the openings in the legs of the loops to be slid onto the support bar but not withdrawn.

BRIEF DESCRIPTION OF THE DRAWINGS

The invention is illustrated more or less diagrammatically in the following drawings wherein:

FIG. 1 is a front elevational view of a storage rack for small articles constructed in accordance with one embodiment of the present invention;

FIG. 2 is a cross sectional view taken along line 2—2 of FIG. 1;

FIG. 3 is a lateral cross section view taken along lines 3—3 of FIG. 1;

FIG. 4 is a plan view of a flattened retainer loop;

FIG. 5 is an isometric projection view of a modified support bar of this invention broken intermediate its ends for economy of illustration;

FIG. 6 is a side elevational view of another embodiment of the storage rack of the invention;

FIG. 7 is a top plan view of the embodiment of the storage rack of FIG. 6 shown broken intermediate its ends for clarity of illustration; and FIG. 8 is a front elevational view of the embodiment of the storage rack of FIG. 6 with its center section broken.

DESCRIPTION OF THE PREFERRED EMBODIMENTS

FIGS. 1 to 4 of the drawings illustrate one embodiment of a storage rack 21 for storing small articles, constructed in accordance with the teachings of the present invention. As is shown most clearly in FIGS. 1 and 2, the rack 21 may be used for the storage of a variety of small articles of varying sizes, shapes and descriptions. Specifically, for purposes of illustration and not by way of limitation, a pencil 23 and a computer disk 25 are shown supported on the rack. It should be understood and appreciated that other articles such as measuring tapes, chalk, putty knives, erasers, paint brushes, cassettes, etc. may also be stored in such a rack.

The rack 21 is formed with a rear wall 31 which is adapted to be positioned against a supporting surface such as a wall, partition, etc. A top wall 33 and a bottom wall 35 are attached to the rear wall. End walls 37 join the rear, top and bottom walls to complete the rack 21. The end walls extend well forwardly of the top and bottom walls as can be seen in FIGS. 2 and 3.

An elongated support bar 41 is installed in the rack and extends between the end walls 37 at a location forwardly of the rear wall 31. The support bar may be conveniently fastened by screws 43 which extend through the end walls 37 and into the ends of the support bar. The support bar 41 is formed with a non-circular transverse cross section to provide better support for the retainer loops and to prevent the retainer loops from pivoting about the support bar from a horizontal orientation to be hereinafter described.

The storage rack 21 and the elongated support bar 41 may be formed of any suitable material such as wood or plastic, although plastic is preferred because of its lightweight, low cost and ease of forming. The storage rack 21 further includes a multiplicity of retainer loops 51. Each retainer loop is formed of a strip of a tough, resilient, abrasive resistant resin, preferably a polyester resin or laminate. The preferred construction for each retainer loop is two layers of oriented polyethylene terephthalate laminated with a central layer of polyethylene, the same basic construction is as used in commercial identification cards and similar articles.

Each retainer loop 51 is formed with a bight portion 53 joining a pair of legs 55 and 57. An opening 59 is formed in leg 55 and in leg 57 with each opening being located near the distal end of its leg. The openings may be formed by stamping, cutting or in any conventional manner suitable for forming an opening in a laminate strip of plastic. The openings are similar in shape to the transverse cross section of the elongated support bar 41 being only slightly larger than the transverse cross section of the support bar as can be most clearly seen in FIG. 3 of the drawings.

The retainer loops 51 are installed on the elongated support bar 41 before the rack 21 is fully assembled. This is accomplished by threading the openings 59 of the legs of each loop 51 over the support bar from one end thereof with the other end of the elongated support bar attached to an end wall 37 to provide a stop for the retainer loops being installed.

In addition to the support provided to the retainer loops 51 by the elongated support bar 41, the edges of the retainer loops also engage the rear wall 31 and top and bottom walls 33 and 35, respectively to provide support for the loops. It should be noted that the bight portions 53 of the retainer loops extend slightly beyond the outward edge of the end walls 37 to prevent the loops from moving apart beyond the periphery of the support rack.

FIGS. 5 to 8 of the drawings show another embodiment of the invention incorporated in a storage rack 71 also useful for storing small articles and things of the type previously described. The storage rack 71 includes a channel-shaped housing 73 having a rear wall 75, a top wall 77, a bottom wall 79 and end walls 81 defining an opening 83 into the housing. The end walls extend forwardly of the top and bottom walls and are rounded at their forward ends.

An elongated support bar 91 is seated at its opposite ends in sockets 93 formed integrally in the end walls 81. The sockets are of oblong shape to receive the support bar 91 which is of similar transverse cross section to provide a tightly engaging fit in the sockets. For ease of piloting, the ends 95 of the support bar are tapered. A rib 97 extends from each socket to the forward end of the end wall. A threaded blind hole 99 is formed in each end 95 of the support bar 91.

The channel-shaped housing 73 and elongated support bar 91 are mounted on a stand 111. The stand includes a base 113 having a top wall 115, rear wall 117, end walls 119 and an inclined front wall 121. Stanchions 123 formed integrally with the base 113 and extend upwardly from the end walls 119 to engage the end walls 81 of the housing 73. A partially cut away wall 125 extends between the stanchions 123 to provide rigidity to the storage rack. Screws 129 extend through the stanchions 123 and end walls 81 to seat in the threaded blind holes 99 in the elongated support bar 91 to fasten the storage rack 71 together. Hollow cylindrical bosses 130 are formed on the underside of the top wall 115 to receive adhesive buttons or suction cups, neither of which is shown, for mounting the storage rack 71 on a surface.

Retainer loops 51 of the type previously described in connection with the embodiment of FIGS. 1 to 4 of this specification are mounted on the support bar 91 with the openings (not shown) of their legs 55 and 57 fitting over and receiving the support bar 91 and the bight portions of the retainer loops extending forwardly of the housing 73 through the opening 83 at the front thereof.

The support bar 91 is designed for ease of mounting of the retainer loops 51 thereon prior to the assembly of the support bar into the storage rack 71. With the support bar 91 in its unassembled state as shown in FIG. 5 of the drawings, the retainer loops 51 are slid onto the support bar from the tapered end 95 shown on the right-hand side as viewed in FIG. 5 of the drawings. Formed on the support bar inwardly of the right-hand end thereof is a one-way stop 131 having an inwardly positioned vertical wall 133 and an outwardly positioned inclined wall 135. Located near the opposite end of the support bar is a two-way stop 137 having vertical walls 139 on each side. Accordingly, the retainer loops 51 can be placed on the support bar 91 by sliding their openings 59 over the inclined wall 135 of the one-way stop 131 and against the two-way stop 137. When a full complement of retainer loops 51 is installed on the support bar 91, it is ready to be assembled into the storage rack 71.

We claim:

1. A storage rack for small articles, comprising:

an elongated housing having a top wall, a bottom wall and end walls, an elongated support bar located between said top and bottom walls and extending between said end walls, said elongated support bar having a transverse cross section which is non-circular, a multiplicity of retainer loops mounted side by side on said elongated support bar, each retainer loop formed of a strip of a tough, resilient, abrasion-resistant resin having a bight portion and two legs, and an opening formed in each leg near its distal end for mounting said retainer loop on said elongated support bar, each opening having a shape similar to but larger than said non-circular transverse cross section of said elongated support bar.

2. The storage rack of claim 1 in which a retainer loop stop is formed inwardly of one end of said elongated support bar and an inclined stop is formed at the opposite end of said elongated support bar to allow the retainer loops to be placed on but not removed from said elongated support bar.

* * * * *